June 27, 1944.  G. F. PIEPER  2,352,403
MULTIPLE ROTARY DIESEL ENGINE
Filed March 17, 1943  6 Sheets-Sheet 1

INVENTOR
GEORGE F. PIEPER

BY

ATTORNEYS

June 27, 1944.  G. F. PIEPER  2,352,403
MULTIPLE ROTARY DIESEL ENGINE
Filed March 17, 1943  6 Sheets-Sheet 2
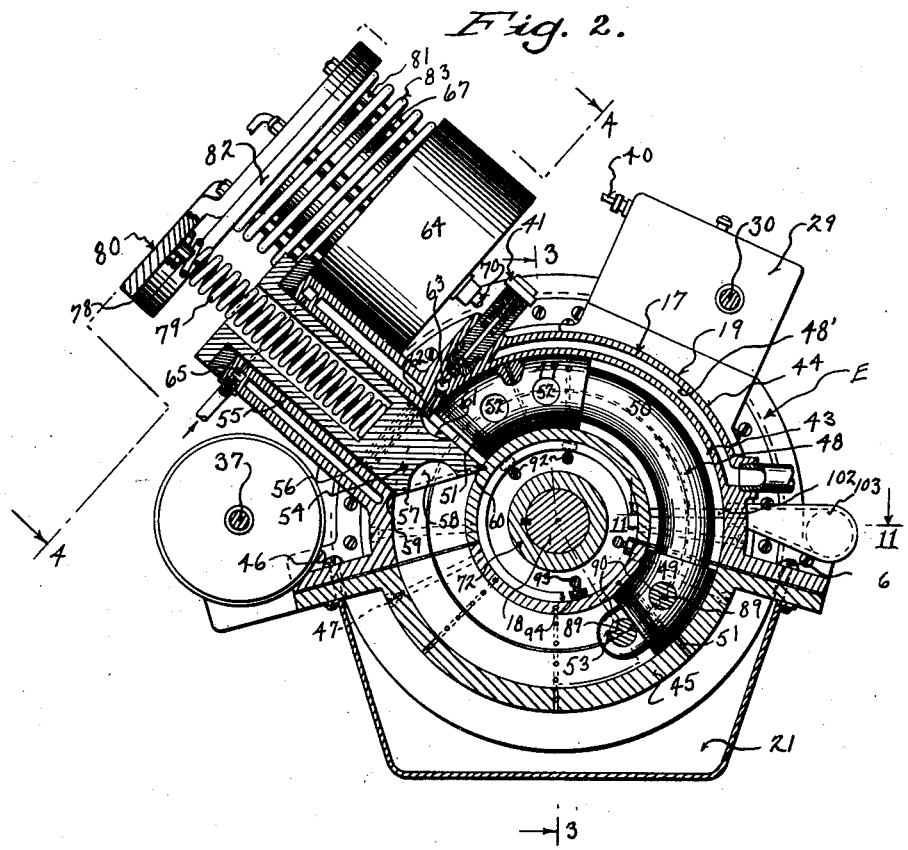
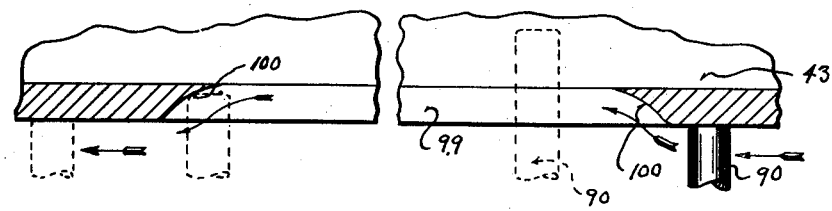
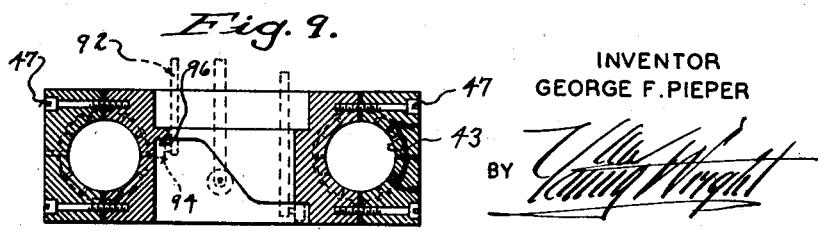
INVENTOR
GEORGE F. PIEPER
BY *[signature]*
ATTORNEYS

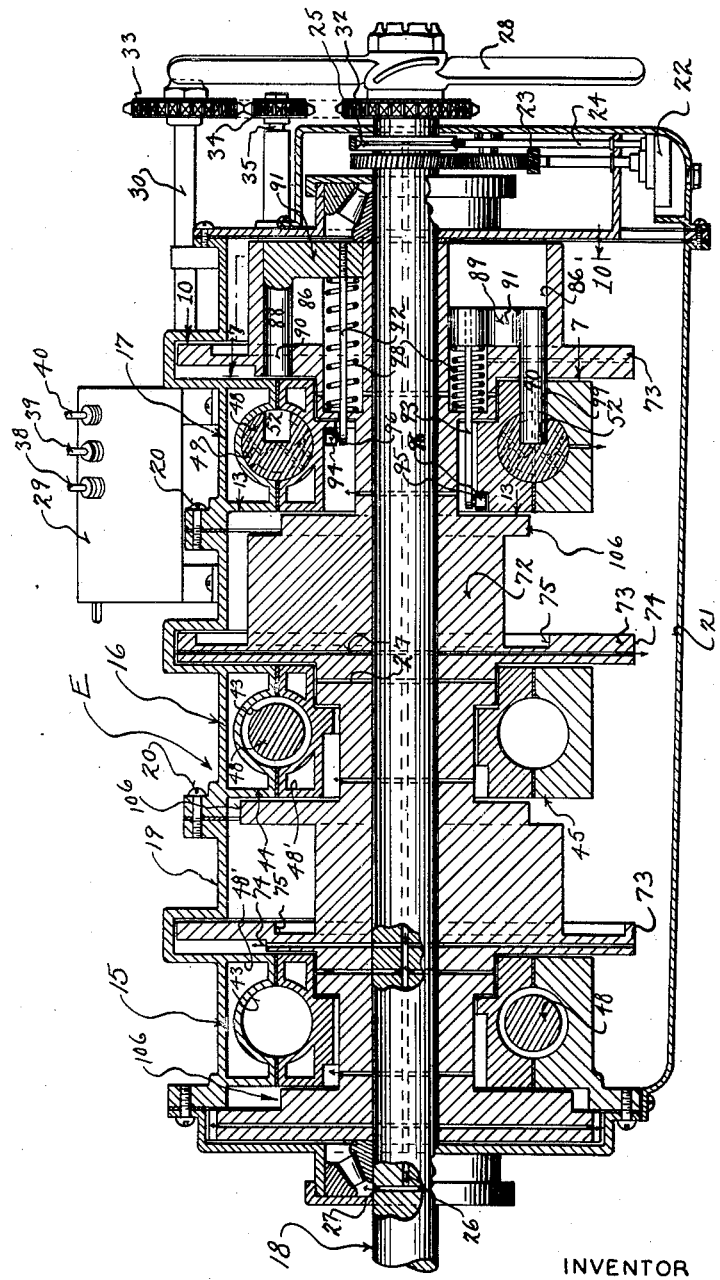

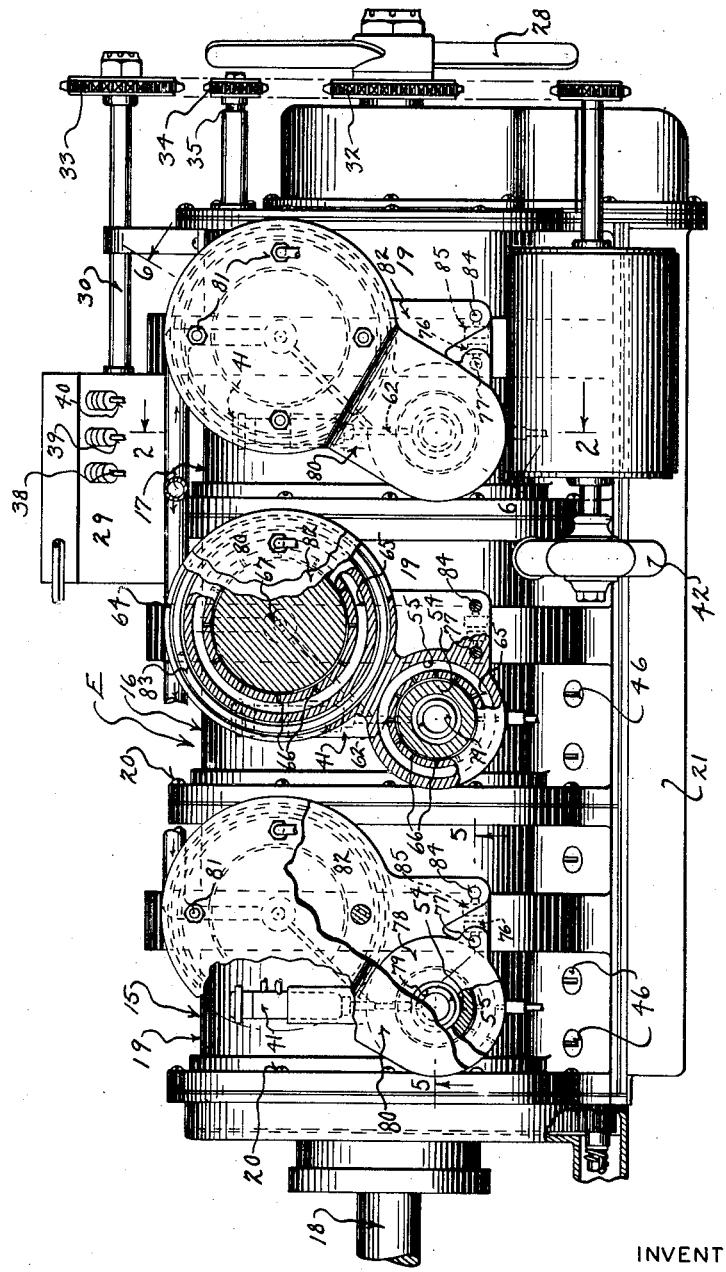

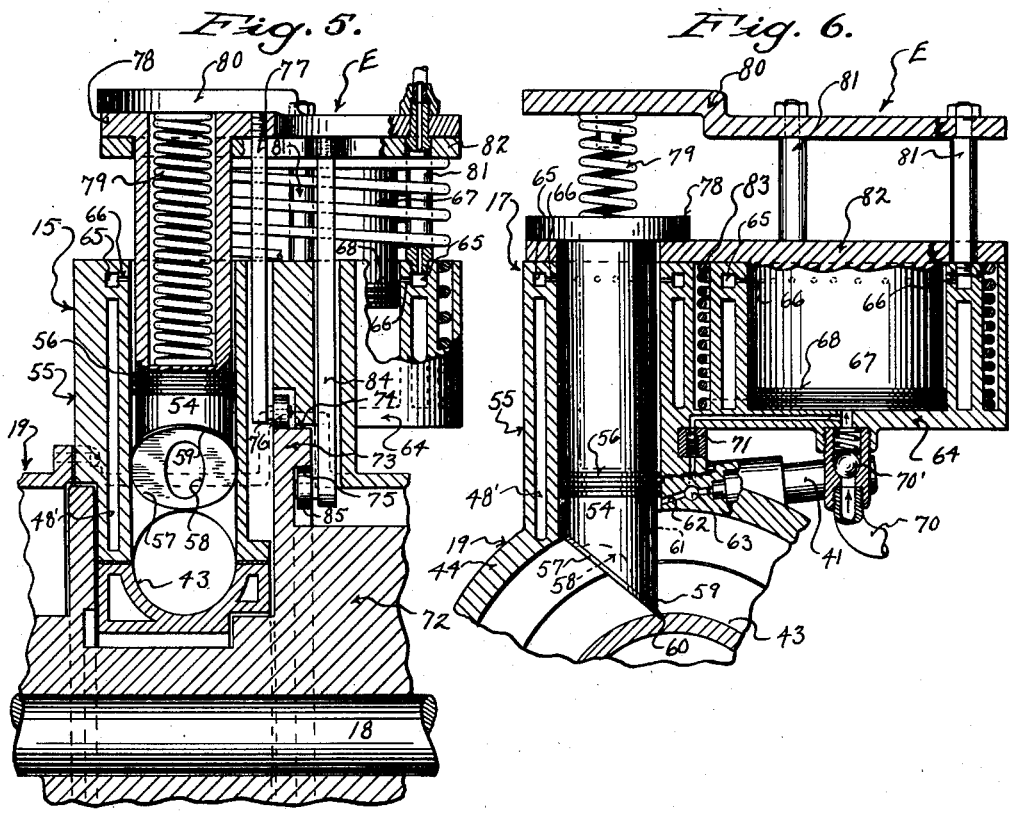
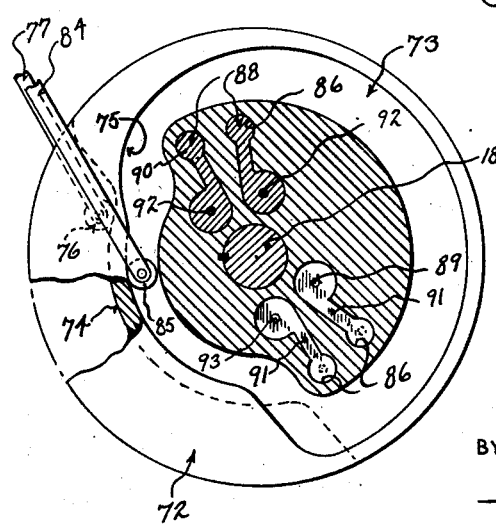

June 27, 1944. G. F. PIEPER 2,352,403
MULTIPLE ROTARY DIESEL ENGINE
Filed March 17, 1943 6 Sheets-Sheet 6

INVENTOR
GEORGE F. PIEPER

BY

ATTORNEYS

Patented June 27, 1944

2,352,403

UNITED STATES PATENT OFFICE 2,352,403

MULTIPLE ROTARY DIESEL ENGINE

George F. Pieper, Milwaukee, Wis.

Application March 17, 1943, Serial No. 479,408

13 Claims. (Cl. 123—14)

This invention appertains to internal combustion engines and more particularly to rotary internal combustion engines of the Diesel type.

Much difficulty has been experienced in properly sealing rotary engines against loss of compression and power and for properly scavenging the burnt charge after the power cycle.

One of the primary objects of my invention is to provide an engine of the rotary Diesel type, so constructed and arranged that the same can be adequately and properly sealed upon the admittance of the charge under high pressure and on the power stroke, whereby to effectively prevent loss of power.

Another salient object of my invention is the provision of a rotary internal combustion engine in which a true cylinder and piston for the fuel charge is provided with means for operatively connecting the piston to the rotor in such a manner that the connection will not interfere with the sealing of the cylinder against loss of compression and power.

Another important object of my invention is the provision of a circular cylinder (forming a part of the stator) having a semi-circular slot between the exhaust port and the firing station, with a piston and piston rod in said cylinder for movement around the same and automatically operated means movable through the slot for continuously connecting the piston and rod to and from the rotor.

A further object of my invention is the provision of an abutment located at the firing station, movable into and out of the cylinder at the proper times, whereby the fuel charge will act against said abutment and piston.

A further object of my invention is novel means for forming the abutment whereby the same will have an effective sealing engagement with the cylinder to prevent loss of compression, the abutment functioning somewhat in the nature of a poppet valve.

A still further object of my invention is to provide a rotary engine in which any number of power units or cylinders can be employed and so arranged relative to one another that the power strokes of the various pistons will overlap one another, whereby to bring about a smooth uninterrupted flow of power and the effective balancing of the rotor and shaft in the engine.

A still further important object of my invention is the provision of novel means for operating the air compressor, the fuel pump and the other parts of the engine from the rotor in proper timed relation to one another.

With these and other objects in view, the invention consists in the novel construction, arrangement and formation of parts, as will be hereinafter more specifically described, claimed and illustrated in the accompanying drawings, in which drawings:

Figure 2 is a transverse sectional view through the engine taken on line 2—2 of Figure 4 looking in the direction of the arrows.

Figure 3 is a longitudinal sectional view through the engine taken on the line 3—3 of Figure 2 looking in the direction of the arrows.

Figure 4 is a view partly in elevation and partly in section, the section being taken substantially on the line 4—4 of Figure 2.

Figure 5 is a fragmentary detail sectional view taken on the line 5—5 of Figure 4 looking in the direction of the arrows and illustrating the novel abutment utilized for the charge.

Figure 6 is a fragmentary detail sectional view taken on the line 6—6 of Figure 4 looking in the direction of the arrows showing the abutment in its lowered position in the cylinder, the view also showing the air compressor for delivering air under high compression to the cylinder.

Figure 8 is a sectional view taken on the line 8—8 of Figure 7, the view being somewhat of a diagrammatic nature to illustrate the movement of the pins into and out of the cylinder for connecting the piston with the rotor.

Figure 9 is a fragmentary detail sectional view through one of the cylinders, the cylinder being around the rotor and showing certain cam tracks for operating the pins.

Figure 10 is a detail sectional view taken on the line 10—10 of Figure 3 looking in the direction of the arrows illustrating the rods and cam tracks therefore for operating the abutment head and the compressor piston.

Figure 1:
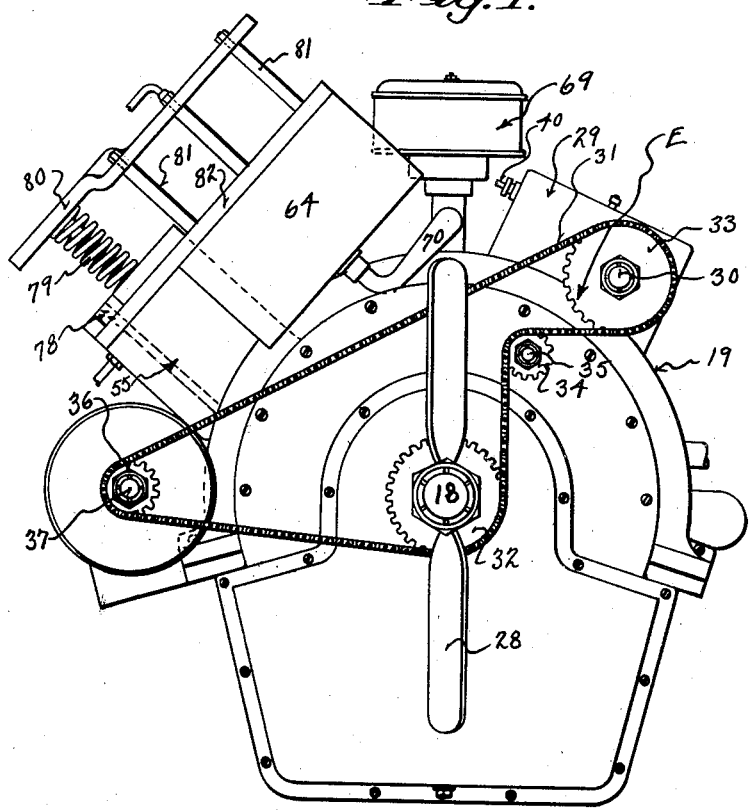
Figure 1 is a front elevational view of my improved rotary Diesel internal combustion engine.

Referring to the drawings in detail, wherein similar reference characters designate corresponding parts throughout the several views, the letter E generally indicates my rotary Diesel internal combustion engine and the same includes a plurality of cylinder or power units 15, 16, and 17. These units are mounted longitudinally on the power take-off shaft 18. While in the drawings I have only illustrated three of the cylinder or power units, it is to be understood that engines may be built with more or less of the units according to the character of the work to which the engine is to be put. Each of the power or cylinder units includes an outer substantially cylindrical stator casing 19 and these casings are firmly united together by stud bolts 20. The meeting edges of the casings are flanged to receive the bolts. A common oil pan 21 is provided for all of the units and is secured thereto. Other appurtenances common to all of the units may be employed, such as an oil pump 22, and it will be noted that the pump is disposed in the oil pan and is of the rotary type and is driven from the power take-off shaft through the medium of a suitable train of gearing 23. The inlet of the pump takes in oil from the pan and the outlet of the pump has communicating therewith the oil conducting pipe 24 which is provided with suitable branches leading to the various parts of the engine to be lubricated. As illustrated, the pipe 24 can lead to an oil dispensing ring 25 which in turn communicates with a longitudinally extending bore 26 formed in the power take-off shaft and this shaft at the desired points is provided with radially extending passageways 27 which lead to the shaft bearings and the other parts to be lubricated, as will be hereinafter more fully described.

The power take-off shaft 18 can also operate the fan 28 for cooling the engine and this fan may be mounted directly upon said shaft 18, as illustrated in the drawings.

Also common to all of the power or cylinder units is the fuel pump 29 and this pump is provided with a drive shaft 30 and the shaft in turn is driven from the power take-off shaft 18 by means of a sprocket chain 31 which is trained about a sprocket wheel 32 keyed to the power take-off shaft, a sprocket wheel 33 keyed to the pump drive shaft 30, an idle sprocket wheel 34 mounted upon a stub shaft 35 and around a sprocket wheel 36 keyed to a shaft 37. The fuel pump 29, however, is provided with independent fuel conducting outlet pipes 38, 39 and 40 which lead respectively to a fuel injector 41 provided for each of the power or cylinder units 15, 16, and 17. The pump 29 will not be described in detail as the same can be of the common type purchased in the open market and it is sufficient to say that the shaft 30 drives the pump plungers for forcing the fuel to the outlet pipes 38, 39 and 40.

The engine is also provided with a water cooling system and the shaft 37, which is driven from the sprocket chain 31, is the drive shaft for the water pump 42 and this pump serves as means for circulating the water around the water jackets in the cylinder or power units as will be later set forth.

Figure 7:
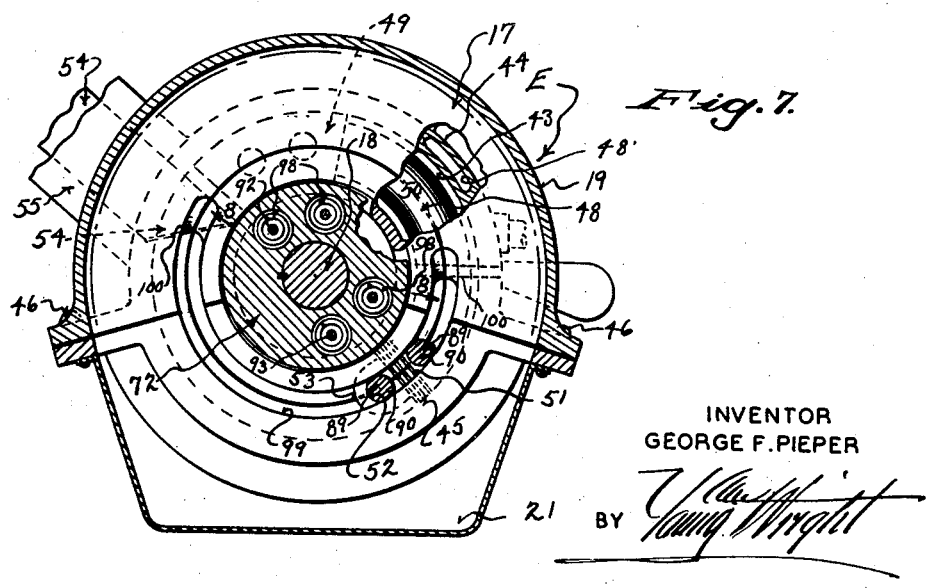
Figure 7 is a transverse sectional view through the engine taken on the line 7—7 of Figure 3 looking in the direction of the arrows illustrating the formation of the rotor and stator and the pins for connecting the piston to the rotor.

Each cylinder or power unit is constructed substantially the same and each includes a circular or annular cylinder 43. The cylinders are made in upper and lower sections 44 and 45 and these sections are bolted together by means of bolts 46 which extend through flanges formed on the ends of the cylinder sections. By referring to Figures 2 and 3 and 7, it will be noted that each cylinder section is made from inner and outer halves and these halves are fastened together by stud bolts 47. Suitable gaskets are disposed between the cylinder sections and the section halves. The casings of the power units can be formed on the cylinders and hence the cylinders form a direct part of the stator. The outer halves of the cylinder sections 44 are provided with water jackets 48' and the pump 42 is utilized to circulate the water through these jackets as heretobefore stated. The jackets are disposed around the firing chamber portion of each cylinder.

Mounted for movement within each cylinder 43 is an arcuate piston 48. Each piston 48 includes spaced piston heads 49. The inner ends of the heads are connected by a rigid arcuate piston rod 50. The heads 49 at their outer ends are provided with piston rings 51 for engagement with the walls of the cylinders. These piston heads have each formed therein spaced transversely extending openings 52 and these openings form an important part of the present invention. It is to be noted, by referring to Figure 2, that one opening in one piston head is formed in a circular extension 53 formed on said head. The piston itself is of a slightly greater size than half of a circle and hence the same occupies a little more than half of its cylinder. The pistons and the cylinders will again be referred to.

Each cylinder 43 has associated therewith a reciprocatory abutment head 54 and each abutment head is slidably mounted within a casing or housing 55 which extends substantially radially from its cylinder 43. This abutment head moves into and out of its cylinder at certain predetermined times and each abutment head is provided with piston rings 56 for sealing contact with the inner surface of its casing 55. The inner face of each abutment head is beveled and inclined as at 57 and this inclined face is provided with a pocket 58. The extreme outer edge of the face is preferably enlarged as at 59 and this enlarged portion is adapted to snugly fit in a groove 60 formed in the inner surface of its cylinder 43. Thus each time the abutment head rides into the cylinder, the same will have sealing contact with its cylinder and if necessary, or desirable, the inner end of the abutment head can be formed from special metal to facilitate the accurate seating of its beveled face on the seat 60. The side of the abutment head opposite the pocket 58 is provided with a firing chamber pocket 61 and one end of the piston faces this pocket during the firing of the charge. Leading into this pocket through the cylinder wall is a fuel passageway 62 and this passageway communicates with a fuel injector 41. As stated, there is a fuel injector for each power unit and the fuel injector is connected to the fuel pump and governor 29 by the fuel conduits 38, 39 and 40. This injector will not be described in detail as the same can be of any preferred character or make. Communicating with the passageway 62 is an air inlet passageway 63 and this passageway 63 leads to the outlet of an air compressor 64. An air compressor 64 is provided for each power unit and the compressor casing can be connected with or casted on the casing 55 of each abutment head 54. The casings for the air compressor and the abutment head are also provided with water jackets and the water through the jackets is circulated by the water pump 42. Each of these casings is also provided with an annular oil passageway 65 and openings 66 lead from the oil passageway to the interior of the casings for lubricating the sides of the casings for facilitating the movement of the abutment head 54 and the air compressor piston 67. The air compressor piston 67 can also be provided with piston rings 68. An air cleaner 69 is provided for the motor and the air outlet of the cleaner has communicating therewith pipes 70 which lead to the intake of the three air compressors. In each pipe 70 is arranged a spring pressed one-way opening inlet valve 70' and an oppositely opening spring pressed check valve 71 is arranged in the air passageway 63 which communicates with the fuel injector.

The compressor piston 67 and the abutment head 54 are spaced from the rotor 72 of the engine. This rotor is keyed or otherwise secured to the power take-off shaft 18 and the pistons 48 form a part of this rotor and are latched to the rotor by means, which will be hereinafter more fully described.

Each power unit is provided with a cam wheel 73 having inner and outer cam tracks 74 and 75. These cam wheels are formed on the rotor 72 adjacent to the cylinder of each power unit. The outer cam track 74 is engaged by an anti-friction roller 76 of the abutment head operating rod 77. This rod is rigidly connected to the flanged upper end 78 of the abutment head and consequently the abutment head is moved in and out during the rotation of the rotor. Confined within the abutment head is an elongated coil spring 79 and the inner end of this spring bears against a compression plate 80 which is carried by stud bolts 81 connected to the casing of the air compressor unit. Secured to the compressor piston 67 is a guide plate 82 which slides on the stud bolts 81. This plate 82 extends under the flanged end 78 of the abutment head 54 and hence the flanged end 78 of the abutment head is disposed between the guide plate 82 of the compressor and the stationary plate 80 of the compressor. A relatively heavy expansion coil spring 83 is carried by each compressor and the lower end of each spring 83 engages the casing of its compressor and the upper edge of each spring engages its guide plate 82. Connected to each guide plate 82 is an operating rod 84 and the inner end of the operating rod 84 is provided with an anti-friction roller 85 which engages the inner cam track 75 of the cam wheel 73. Hence, the compressor piston 67 is operated from said cam wheel.

The spring 79 of the abutment head 54 is lighter than the spring 83 of the air compressor and works in the opposite direction thereto and hence the spring 79 normally functions to urge the abutment head 54 into its power cylinder and the roller 76 against its cam track 74. The relatively heavy spring 83 of the compressor tends to lift the compressor piston 67 and to hold the anti-friction roller 85 of the operating rod 84 against its cam track 75.

The rotor 72 adjacent each cylinder 43 of each power unit is provided with pairs of guide openings and recesses at spaced points, as at 86 (see Figure 3) for the reception of latch pin sets 88 and 89. These latch pin sets are spaced a distance apart equal to the distance between the piston heads 49 of the power piston 48, so that the latch pins of the sets can successively engage the heads 49. Each of these latch pin sets include a pair of independently movable spaced latch pins 90, and each latch pin is provided with a laterally extending foot 91. These feet 91 of the latch pins are snugly mounted with the recesses 86 in the rotor, and the feet of one latch set 88 each carry an inwardly directed operating rod 92, and the feet 91 of the other latch set 89, each carry similar rods 93. The inner ends of the operating rods 92 and 93 carry respectively, anti-friction rollers 94 and 95 which engage a cam track 96 formed on the inner surface of the power cylinder 43. Expansion coil springs 98 are coiled about the operating rods 92 and 93 and bear against a part of the rotor and the feet 91 of the latch pin units and hence these springs normally function to urge the latch pins away from their power cylinders 43 and to hold the anti-friction rollers of the operating rods against the cam track 96. Each power cylinder 43 is slotted on one side, as at 99, to permit the latch pins to project through the power cylinders 43 into the transverse openings 52 formed in the piston heads 49. The arcuate slot 99 is formed in that part of each cylinder 43 in which the firing of the charge does not take place and the end walls of the arcuate slot 99 are preferably tapered, as at 100, to facilitate the riding of the latch pins of the units 88 and 89 into and out of the slot 99.

One cycle of operation for one cylinder unit will now be described and considering that the air compressor and the fuel injector have been operated and the abutment head 54 is in its lowered sealed position (see Figure 2), the engine is ready for the power stroke. The fuel charge, i. e. the air, and the liquid fuel is forced against the abutment head under great pressure and this fuel charge is directed toward the pocket 61. The air and liquid fuel, meeting under compression in the chamber 63, fires, and hence the firing charge is directed in the firing chamber of the glider by the pocket 61 of the abutment head 54 and acts against the piston head 49 which is adjacent to said abutment head. At this time, the piston 48 is latched to the rotor by the latch pins of unit set 89 which have been pulled into the cylinder 43 by the cam track 96 and hence the piston 48 is connected to the rotor at a point spaced from the firing chamber. The latch pins of unit set 88 are disengaged from the piston and drawn out of the cylinder by their springs 98 and as the charge is fired the piston is forced around in the cylinder carrying the rotor therewith. As the forward end of the piston 48 having the enlargement 53 approaches the abutment head, the abutment head 54 is moved outwardly by the action of the operating rod 77 and its anti-friction roller 76 riding on the track 74. At this time the compressor piston 67 is raised by its spring 83 which is permitted due to the formation of the cam track 75 and a new charge of clean air is sucked into the compressor. Synchronous with this action, the latch pins of the unit set 89 are withdrawn one at a time from the power cylinder 43 and the piston, by the action of their springs 98, which is permitted, due to the formation of the cam track 96. The latch pins 90 of the unit set 88 now occupy the position originally occupied by the latch pin set unit 89 and the latch pins of unit 88, one at a time, are now brought into the cylinder against the tension of their springs 98 and into the openings 52 formed in the piston head 49 which is remote from the piston head having the extension 53. As one latch pin of the unit set 88 is withdrawn from the piston head having the extension 53, one latch pin of the set 88 moves into engagement with the other piston head. Hence, the piston is latched at all times to its rotor. The piston continues rotation under its own momentum (or by the operation of the other power units) until the piston again assumes the original position shown in Figure 2, and at this time the piston head 48 carrying the extension 53 is latched to the rotor while the other piston head 49 is unlatched from the rotor, the latch pins of unit 89 having been moved one at a time by their track and springs from out of engagement with the piston head. At this time the abutment head 54 again lowers to close the compression and firing chamber and the compressor piston 67 is forcibly lowered by the operating rod 84 and its anti-friction roller 85, which engages the track 75, and clean air under great pressure is again forced into the chamber 63 and mingles with the charge injected into the chamber 63 by the injector 41.

From the foregoing it can be seen that the power piston 48 is alternately latched to the rotor by first one latch pin unit 89 and then by the other latch pin unit 88 although at no time is the power piston completely free from the rotor and this operation is continuous on each cycle of the power piston. As the latch pin units never enter the combustion chamber and the combustion chamber is not slotted for the latch pins, the proper sealing of the combustion chamber is insured. The riding of the latch pins 90 of the latch pin units into and out of the arcuate latch pin slot 99 is facilitated due to the tapered or inclined end walls 100 of the slot 99 (see Figure 8). The shape of the pocket 58 in the abutment head 54 corresponds to the extension 53 on the piston 48 and consequently the movement of the abutment head out of the cylinder 43 is not interfered with by the piston, as the piston approaches the abutment head.

Figure 11:
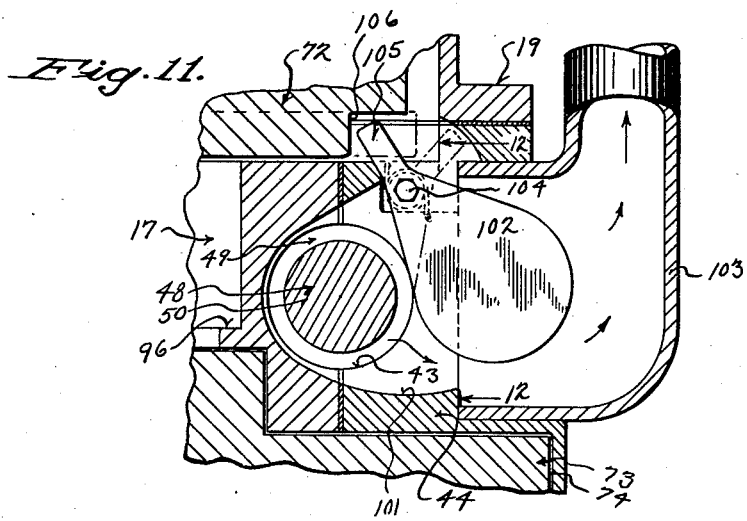
Figure 11 is an enlarged detail sectional view illustrating the gate valve for the exhaust channel, the section being taken on the line 11—11 of Figure 2 looking in the direction of the arrows.
Figure 12:
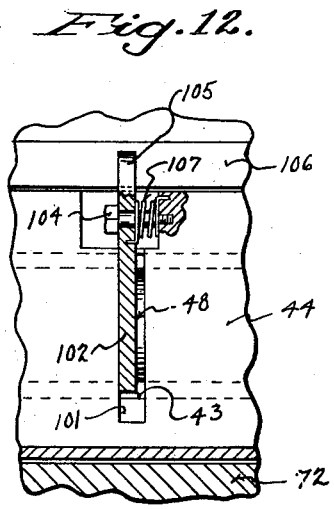
Figure 12 is a detail sectional view taken on the line 12—12 of Figure 11 looking in the direction of the arrows showing the exhaust valve.
Figure 13:
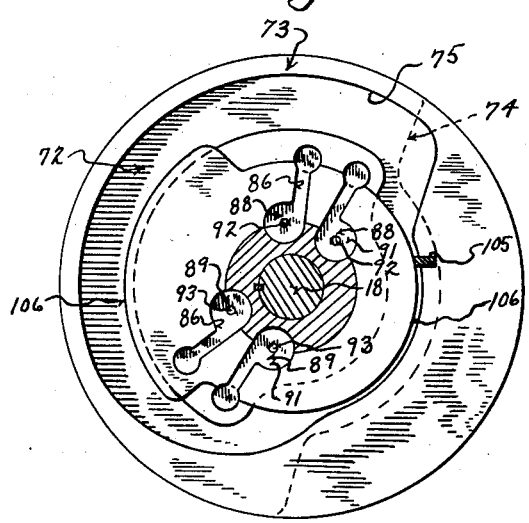
Figure 13 is a detail sectional view taken on the line 13—13 of Figure 3 looking in the direction of the arrows and showing the cam track for operating the exhaust gate valve.

On each revolution of the piston, the firing chamber is scavenged and each power cylinder unit 43 is provided with an exhaust port or passageway 101. This exhaust port is spaced from the abutment head 54 and as the power piston head 49, which is remote from the extension 53, rides past the exhaust port or passageway 101, the flow of the burnt charge from the cylinder is permitted. Special means including a swinging gate valve 102 is provided for facilitating the removal of the burnt charge from the cylinder and at this time it is to be noted that the exhaust port 101 communicates with an exhaust pipe 103 which can be led to an exhaust manifold and this exhaust manifold can be common for all of the power units. The swinging gate valve 102 is rockably mounted at one end on a pivot 104 carried by the power cylinder 43 and this end of the gate valve is provided with a tail piece 105 which extends out of the cylinder into the rotor 72. The rotor 72, at this point, is provided with a cam track 106 and the tail piece is normally urged into constant engagement with the cam track by a spring 107. This cam track is best shown in Figures 11 and 13 and the cam track is so shaped as to swing the gate valve 102 on its pivot into the cylinder when a piston head rides past the exhaust passageway 101. Thus the body portion of the gate valve is shaped to correspond to the circular configuration of the power cylinder and in effect the gate valve acts as an abutment. The exhaust passageway 101 is wider than the gate valve 102. Thus as the combustion takes place and the piston head 49 rides past the exhaust passageway and the gate valve, the piston head carrying the extension 53 rides into the combustion chamber and forces the burnt charge ahead of the same toward the gate valve. The piston head carrying the extension 53 carries air in front of the same under slight compression (due to its approach to the abutment head 54) and consequently this air under compression, upon the raising of the abutment head facilitates the driving of the burnt charge from the combustion chamber out of the exhaust port or passageway. This burnt charge escapes between the gate valve and the walls of the exhaust port 101 into the exhaust pipe 103 and as the extension 53 on the piston approaches the gate valve, the gate valve is swung out of the power cylinder 43 into the exhaust pipe by the cam track 106 operating on the tail piece 105.

Figure 14:
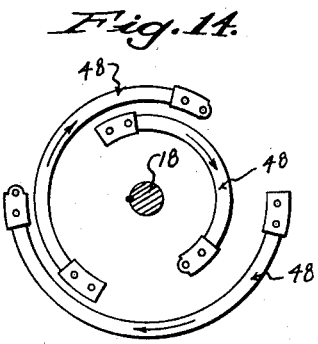
Figure 14 is a diagrammatic view illustrating the relation of the various pistons of the power units relative to one another to bring about the smooth uninterrupted flow of power, it being understood that in this diagrammatic view the pistons are all of equal size and are actually one in rear of the other.

The pistons and cylinders of the power unit 15, 16 and 17 are so arranged relative to one another around the power take-off shaft 18, that combustion takes place in one cylinder immediately after combustion has taken place in another cylinder. In other words, the cylinders are arranged with their combustion chambers at thirds around the power take-off shaft and thus a continuous flow of power is insured. The arrangement of the combustion chambers and the pistons of the cylinders is diagrammatically shown in Figure 14.

Certain branches of the oil conducting oil pipe 24 (which lead from the oil pump 22) extend to the oil passageway in the casings for the abutment head 54 and the air compressors 64.

From the foregoing description, it can be seen that I have provided a rotary Diesel combustion engine in which the sealing of the combustion chamber is insured and in this regard I lay particular stress on the sealing of the abutment head 54 with the walls of its power cylinder and the latching and unlatching of a power piston with its rotor part.

Changes in details may be made without departing from the spirit or the scope of my invention, but what I claim as new is:

1. In a rotary Diesel internal combustion engine, a stator including an annular cylinder of a circular shape in cross section, a rotor including a power take-off shaft, an arcuate piston having piston heads at their opposite ends snugly fitted in said cylinder for movement around said cylinder, said cylinder having a combustion chamber, an abutment head movable into and out of the combustion chamber and having sealing contact with the walls thereof when in its inner-most position, the abutment head having its side facing the combustion chamber provided with a pocket, means for leading fuel and air under compression into the combustion chamber toward said pocket and means for connecting the piston to the rotor, said last named means including latch pins carried by the rotor and automatic means for coupling the latch pins with the piston at a point remote from the firing chamber.

2. In a rotary Diesel internal combustion engine, a stator including an annular cylinder of a circular shape in cross section having a combustion chamber at one side and a slot on the other side, an arcuate piston fitted within said cylinder for movement around said cylinder, an abutment head movable into the cylinder for sealing one end of the combustion chamber, means for introducing fuel and air under compression into the combustion chamber adjacent the abutment head, latch pins slidably carried by the rotor movable into the cylinder through the slot for latching engagement with the piston and means for operating said latch pins into and out of the slot.

3. In a rotary Diesel internal combustion engine, a stator including an annular cylinder having a combustion chamber on one side and an arcuate slot on the other side, a rotor including a power take-off shaft, an arcuate piston fitted within the cylinder for movement around said cylinder, latch pins movable through the slot for connecting and disconnecting the piston with the rotor, means for operating the latch pins, an abutment head movable into and out of the cylinder having sealing contact with the walls of the cylinder when it is in its inner-most position for sealing one end of the combustion chamber, means for injecting fuel and air under high compression into the combustion chamber adjacent the abutment head, and means operated from the rotor for moving the abutment head into and out of the cylinder.

4. In a rotary internal combustion engine, a stator including an annular cylinder having a combustion chamber on one side and an arcuate slot on the other side, an abutment head movable into and out of the combustion chamber, a rotor including a power take-off shaft, an arcuate piston having heads at its opposite ends snugly fitted in said cylinder for movement around the same, sliding latch pin units carried by the rotor and movable into the cylinder through the slot, the piston heads having openings for receiving parts of the latch pin units, means for introducing a combustion charge into the combustion chamber adjacent the abutment head, spring means normally urging the latch pin units away from the cylinder, cam tracks on the stator an operating rod carried by each latch pin unit having an anti-friction roller for engaging a cam track, said tracks having portions thereon for pulling the latch pin units into the cylinder for engagement with the piston at predetermined times.

5. In a rotary internal combustion engine comprising a stator including an annular cylinder having a firing chamber in one portion and an arcuate slot in another portion, an abutment head movable into and out of the combustion chamber and having sealing contact with the walls thereof when in its extreme inward position, a rotor including a power take-off shaft, an arcuate piston having a head at each end snugly fitted in said cylinder for movement around the cylinder, means for operating the abutment head from the rotor, means for injecting a fuel charge into the combustion chamber between the abutment head and a piston head, the piston heads having diametrically extending sockets, operated latch pin units carried by the rotor for movement into the sockets at predetermined times through the slot and means alternately moving the latch pin units into and out of the sockets.

6. In a rotary Diesel internal combustion engine, a stator including an annular cylinder of a circular shape in cross section having a combustion chamber in one portion thereof and an arcuate slot in the other portion thereof, an abutment head movable into and out of the combustion chamber having sealing contact with the walls thereof when it is in its extreme inward position for sealing one end of the combustion chamber, means for injecting the fuel charge under pressure into the combustion chamber adjacent the abutment head, an arcuate piston having piston heads at its opposite ends snugly fitted in the cylinder for movement around the cylinder, means for actuating the abutment head into and out of the cylinder from the rotor in proper timed relation relative to the movement of the piston, means operating through the slot for latching the piston to the rotor, said cylinder having an exhaust passageway therein at the end of the combustion chamber and an abutment gate movable into the cylinder through the passageway after a piston head rides past said exhaust passageway, the exhaust passageway being of a greater width than said gate.

7. In a rotary Diesel internal combustion engine, a stator including an annular cylinder of a circular shape in cross section having a combustion chamber in one portion thereof and an arcuate slot in the other portion thereof, an abutment head movable into and out of the combustion chamber having sealing contact with the walls thereof when it is in its extreme inward position for sealing one end of the combustion chamber, means for injecting the fuel charge under pressure into the combustion chamber adjacent the abutment head, an arcuate piston having piston heads at its opposite ends snugly fitted in the cylinder for movement around the cylinder, means for actuating the abutment head into and out of the cylinder from the rotor in proper timed relation relative to the movement of the piston, means operating through the slot for latching the piston to the rotor, said cylinder having an exhaust passageway therein at the end of the combustion chamber and an abutment gate movable into the cylinder through the passageway after a piston head rides past said exhaust passageway, the exhaust passageway being of a greater width than said gate, said gate being rockably carried by the stator, and means for operating the gate from the rotor in proper timed relation relative to the movement of the piston.

8. In a rotary Diesel internal combustion engine, a stator including an annular cylinder of a circular shape in cross section having a combustion chamber in one portion thereof and an arcuate slot in the other portion thereof, an abutment head movable into and out of the combustion chamber having sealing contact with the walls thereof when it is in its extreme inward position for sealing one end of the combustion chamber, means for injecting the fuel charge under pressure into the combustion chamber adjacent the abutment head, an arcuate piston having piston heads at its opposite ends snugly fitted in the cylinder for movement around the cylinder, means for actuating the abutment head into and out of the cylinder from the rotor in proper timed relation relative to the movement of the piston, means operating through the slot for latching the piston to the rotor, said cylinder having an exhaust passageway therein at the end of the combustion chamber and an abutment gate movable into the cylinder through the passageway after a piston head rides past said exhaust passageway, the exhaust passageway being of a greater width than said gate, said gate being rockably carried by the stator, and means for operating the gate from the rotor in proper timed relation relative to the movement of the piston, said means for operating the gate including a cam track on the rotor, a tail piece on the gate and spring means normally urging the tail into continuous contact with the cam track.

9. In a rotary internal combustion engine, a stator including an annular cylinder having a combustion chamber, a rotor including a power shaft, an arcuate piston fitted in said cylinder for movement around said cylinder, means for connecting the piston to the shaft, a reciprocating abutment head movable into the cylinder having sealing contact with the walls thereof when the head is in its inner-most position for closing one end of the combustion chamber, a fuel injector, means for supplying fuel to the injector, the stator having a passageway communicating with the combustion chamber and leading toward said abutment head, an air compressor having its outlet in communication with the passageway, said compressor including a piston, operating rods for the piston and the abutment head and cams on said rotor for actuating said operating rods, spring means normally urging the abutment head into the cylinder and spring means normally urging the piston of the compressor toward the outer end of its cylinder.

10. In a rotary Diesel internal combustion engine, a stator including an annular cylinder having a combustion chamber, a rotor including a power take-off shaft concentrically disposed relative to the cylinder, an abutment head slidably carried by the stator movable into and out of the cylinder, the cylinder having a seat and the inner end of said abutment head being provided with a face for snugly engaging said seat when the abutment head is in its inner-most position in said cylinder for closing one end of the combustion chamber, a fuel injector, means for supplying fuel to the injector, said stator having a passageway leading from the injector into the cylinder adjacent said abutment head, an air compressor having its outlet communicating with said passageway, said abutment head and compressor being arranged in side by side relation, a stop plate carried by the compressor having guide rods, an expansion spring having one end engaging said plate and the other end the abutment head for normally urging the abutment head into the firing chamber, the end of said head remote from the cylinder being provided with a flange, a guide plate carried by the compressor piston slidably mounted on the guide rods and disposed under said flange, a lift spring of greater tension than the first mentioned spring confined between the guide plate and the compressor cylinder for normally moving the compressor piston away from its outlet, operating rods connected to the abutment head and the piston, cam tracks on said rotor, and anti-friction rollers carried by the operating rods engaging the opposite sides of the cam tracks.

11. In an internal combustion engine of the rotary Diesel type, a stator including an annular cylinder, having a combustion chamber, a rotor including a power take-off shaft concentrically disposed relative to the cylinder, an arcuate piston fitted within the cylinder for movement around the same, means for latching the piston to the rotor including latch units carried by the rotor, means including operating rods on said units and cam tracks on the cylinder for actuating said units, an abutment head slidably carried by the cylinder movable into and out of the combustion chamber, an air compressor including a piston and an outlet conduit, said cylinder having a passageway leading into the combustion chamber adjacent to the abutment head, a fuel injector communicating with said passageway and having a check valve therein, and means for operating the abutment head and the compressor piston including operating rods connected respectively to the abutment head and the compressor piston, cam tracks on the rotor and anti-friction rollers carried by the operating rods engaging the cam tracks.

12. In a rotary internal combustion engine, a stator including an annular cylinder, said cylinder including arcuate sections, means securing said sections together, and each of said sections including inner and outer companion half portions.

13. In a rotary internal combustion engine, a stator including an annular cylinder, said cylinder including arcuate sections, means securing said sections together, and each of said sections including inner and outer companion half portions, sealing means between the sections and said half portions, and means securing the half portions together.

GEORGE F. PIEPER.